April 17, 1962
R. I. C. HANSEN
3,029,886
COMBINATION PARKING DEVICE, WHEEL JACK, AND WHEEL
BLOCKING DEVICE FOR AUTOMOTIVE VEHICLES
Filed July 2, 1959
3 Sheets-Sheet 1
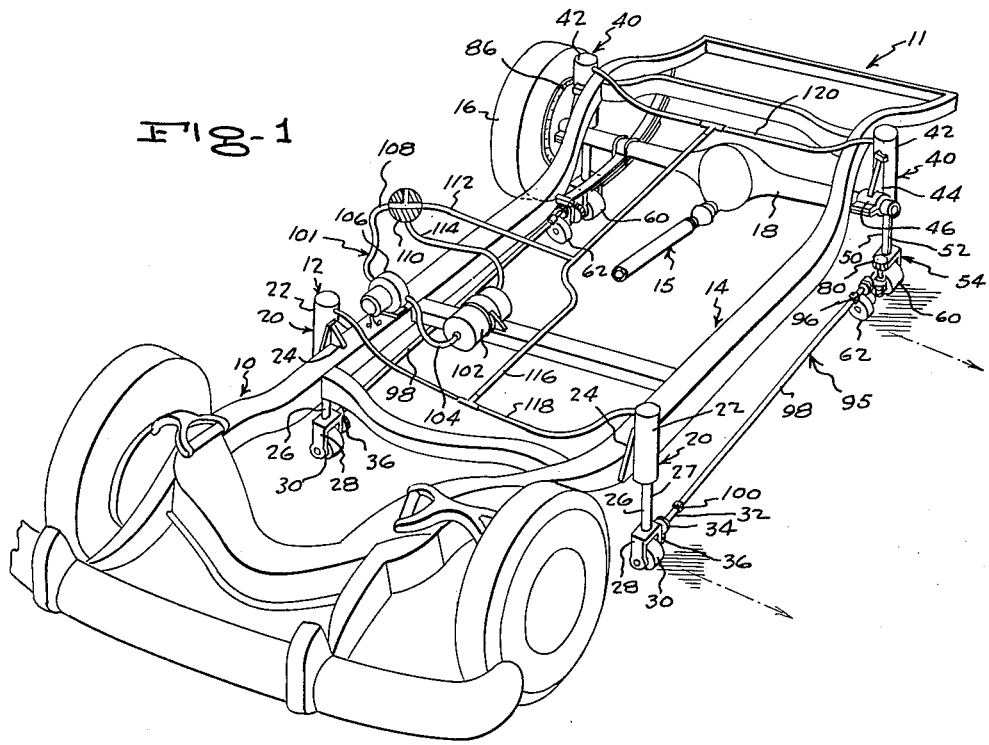
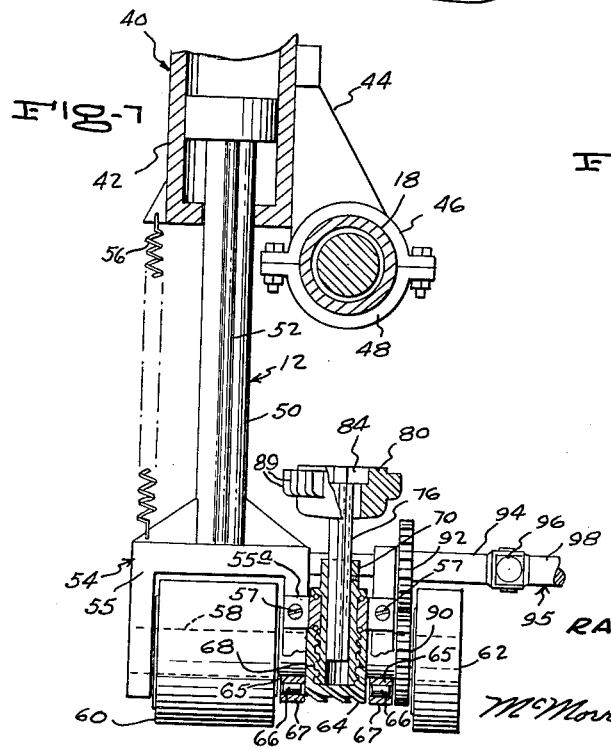
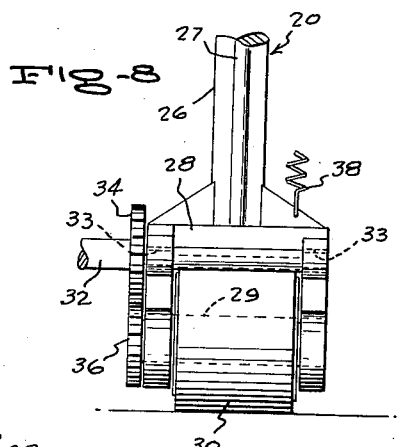
INVENTOR.
RASMUS I. C. HANSEN
BY
McMorrow, Berman + Davidson
ATTORNEYS

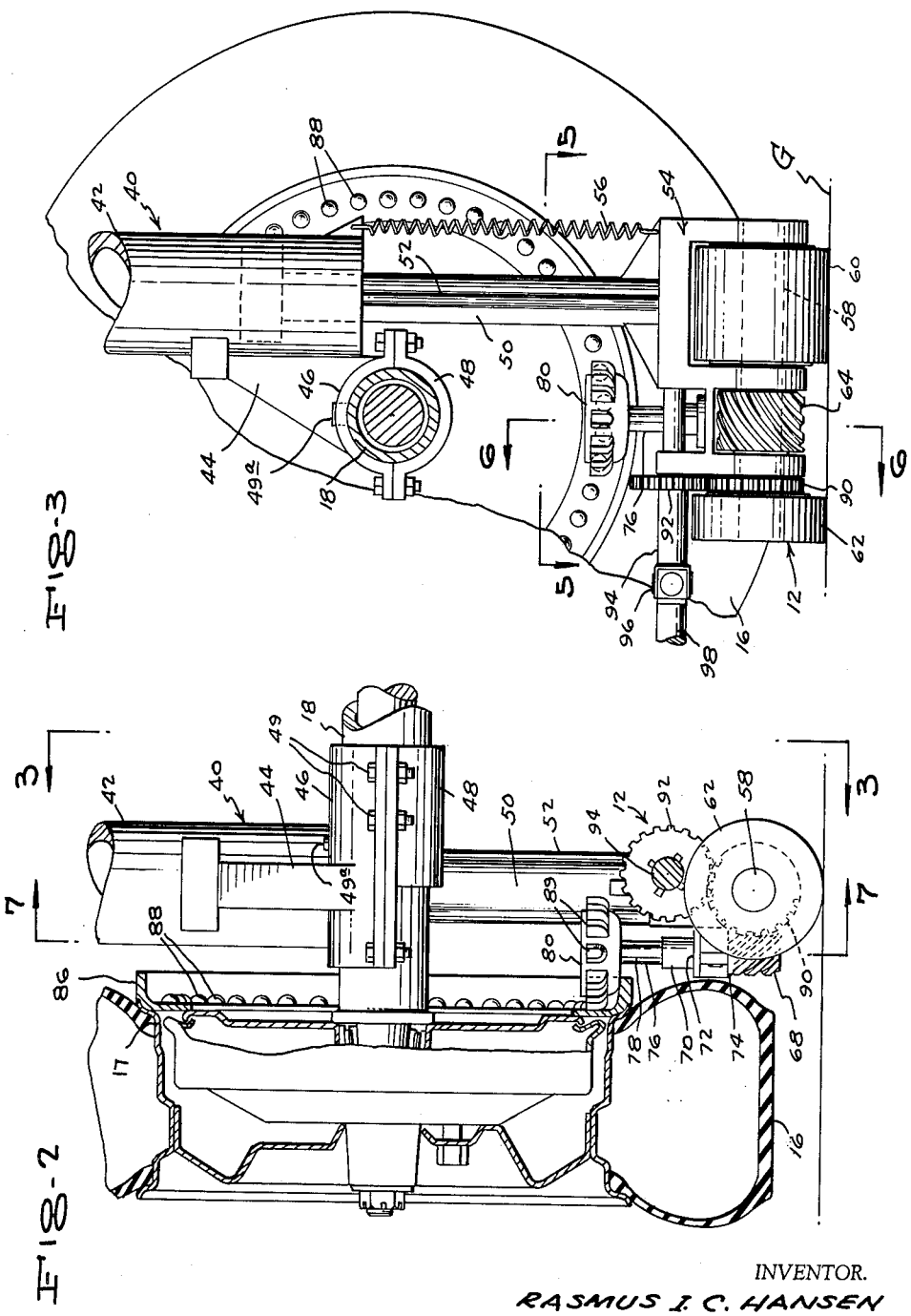

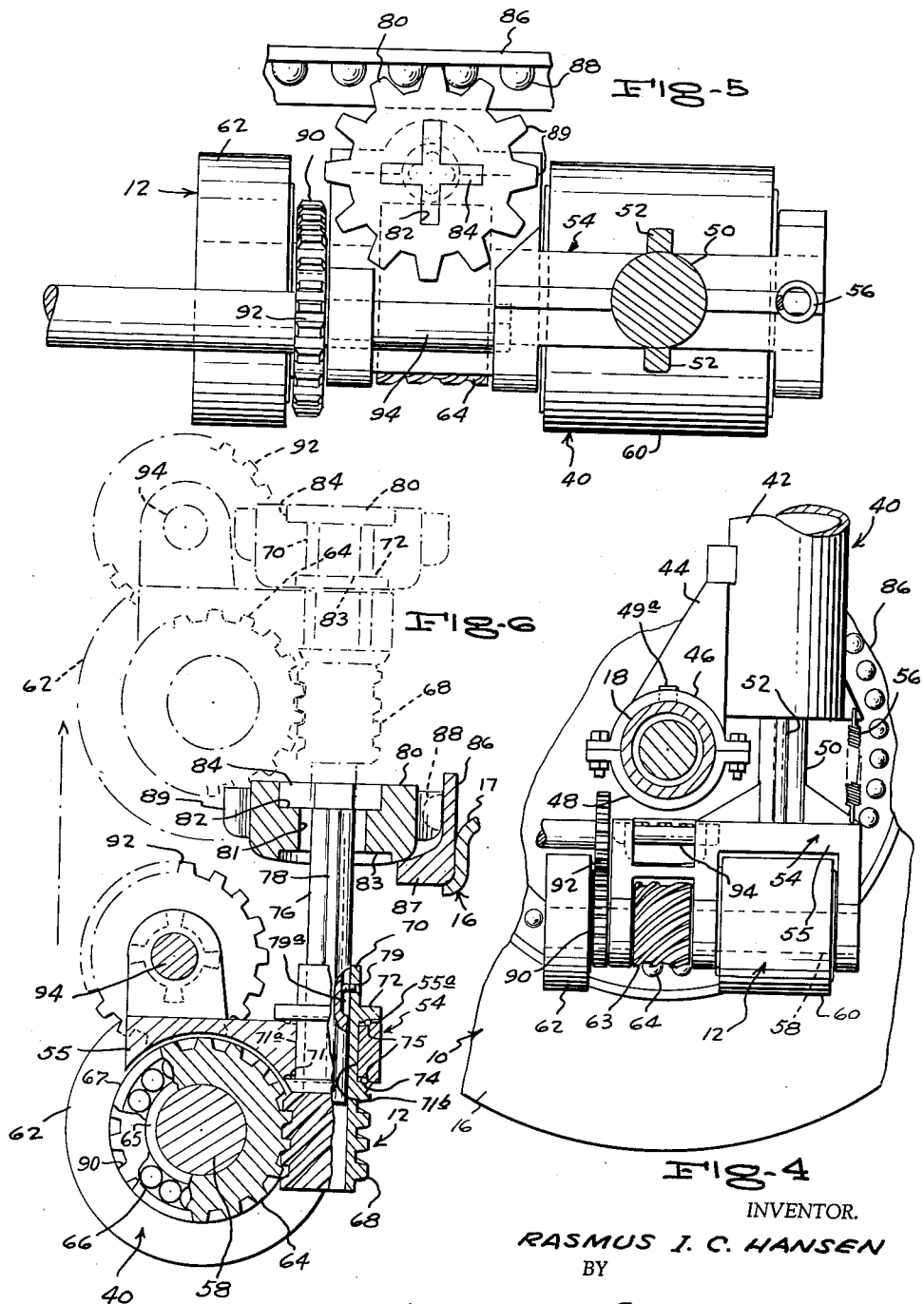

United States Patent Office 3,029,886
Patented Apr. 17, 1962

3,029,886
COMBINATION PARKING DEVICE, WHEEL JACK, AND WHEEL BLOCKING DEVICE FOR AUTOMOTIVE VEHICLES
Rasmus I. C. Hansen, Copenhagen, Denmark
(45 Allison Road, London W. 3, England)
Filed July 2, 1959, Ser. No. 824,693
6 Claims. (Cl. 180—1)

This invention relates generally to equipment or accessories for automobiles, trucks, and related vehicles. More particularly, the invention has reference to a device which has a novel construction such as to permit the same to be used as a parking device for a vehicle on which it is mounted, as a jack usable to advantage during tire changing and other vehicle maintenance or repair operations, or as a wheel-blocking device in situations in which the vehicle may be parked upon a steep incline. In still another usage of the device, the same may be employed in a situation in which it is necessary to move the vehicle laterally for any of various reasons other than parking, as for example, when the vehicle has been damaged in a collision and must be pushed off the highway.

One important object of the present invention is to provide a device of the character stated which, despite its special adaptability for efficiently discharging a multiplicity of functions that are not necessarily related, may nevertheless be capable of manufacture at a comparatively low cost.

Another object is to so design the device as to facilitate its installation upon a vehicle.

Yet another object of importance is to so form the device that it will not interfere in any way with the normal operation of the vehicle, drive contact being made only when needed.

A further object of importance is to provide a parking device in which lateral movement of the vehicle both at the front and rear ends, to the same extent, is produced, as distinguished from arrangements in which it is necessary to head the vehicle into the parking space and swing only the rear end thereof laterally into said space.

Another object is to link rectangularly spaced jacking mechanisms for conjoint operation, in such a way as to swiftly elevate the entire vehicle, in the discharge of any one of the multiplicity of functions previously referred to herein.

Yet another object of importance is to associate with the parking device the driving wheels of the vehicle, in such a way as to cause the vehicle to be moved laterally either into or out of a parking space, responsive to placement of the drive means of the vehicle into either "forward" or "reverse" drive, depending upon whether the vehicle is to be moved into or, on the other hand, out of the parking space.

Another object of importance is to associate the device with the braking system of the vehicle, in such a way that when the device is used for elevating the four wheels of the vehicle off the ground, there will be no rolling movement of the vehicle as long as the brake is set.

A further object of importance is to provide a parking apparatus of the character described which will be substantially completely concealed from view during normal operation of the vehicle, whereby to detract to a minimum extent from the appearance of the vehicle.

Still another important object is to insure that the drive linkage of the parking apparatus will be drivingly engaged with the vehicle drive, before the vehicle wheels actually move out of full contact with the road surface, with the connection being maintained at all times during the loss of contact between the vehicle wheels and the road surface. In this way, it is proposed to insure to the maximum extent that the accidental lateral movement of the vehicle will not occur, thereby imparting a highly desirable safety feature to the invention.

Other objects will appear from the following description, the claims appended thereto, and from the annexed drawings, in which like reference characters designate like parts throughout the several views, and wherein:

FIGURE 1 is a perspective view of a vehicle chassis, equipped with a combination parking, jacking, and wheel-blocking device, according to the present invention, parts of the device being shown somewhat diagramamtically;

FIGURE 2 is an enlarged transverse sectional view through the vehicle taken at the location of one of the drive wheels thereof, the vehicle being shown fragmentarily with one of the jack units of the device being illustrated in extended, vehicle-elevating position;

FIGURE 3 is a view on the same scale as FIGURE 2, taken on line 3—3 of FIGURE 2;

FIGURE 4 is a view like FIGURE 3, in which the unit has been shown in retracted position;

FIGURE 5 is a plan sectional view on a scale increased above that of FIGURE 3, taken on line 5—5 of FIGURE 3;

FIGURE 6 is a vertical sectional view, on the same scale as FIGURE 5, taken substantially on line 6—6 of FIGURE 3, the device being shown in full and dotted lines in extended and retracted positions respectively;

FIGURE 7 is a vertical sectional view, on the same scale as FIGURE 2, taken substantially on line 7—7 of FIGURE 2; and FIGURE 8 is a fragmentary elevational view, on the same scale as FIGURE 2, showing one of the front jack units of the device.

Referring to the drawing in detail, generally designated at 10 is an automotive vehicle, such as an automobile of modern design. This, as is usual, includes a chassis generally designated 11, and in accordance with the invention, there is mounted upon the chassis the combination parking, jacking, and wheel-blocking or chocking device which I have devised, this being generally designated at 12.

The chassis 11 includes the usual vehicle chassis components, namely, a frame, generally designated at 14, and a vehicle drive means, generally designated at 15. The drive means 15 includes the drive wheels 16, which in the illustrated example are the rear wheels of the vehicle, said wheels 16 including the usual wheel rims 17 (see FIGURE 2). The wheels 16 are mounted upon the opposite ends of the usual rear axle housing 18, which is springably suspended from the rear end portion of the vehicle frame.

All this, of course, is completely conventional in a modern-day automobile.

The device 12, as will be readily seen from FIGURE 1, includes a pair of identical, but opposite jack units, generally designated 20. In the illustrated example, these are front jack units, driven by rear jack units that will be presently described in full detail hereinafter.

Each of the driven units 20 includes a generally vertical hydraulic cylinder 22, integral or otherwise rigid with a mounting bracket 24. The bracket 24 of each unit 20 may be welded or otherwise fixedly secured to the adjacent side member of the vehicle frame, it being mainly important that each cylinder 22 has a strong, fixed connection to the adjacent side portion of the vehicle frame.

Working in each cylinder 22 is a ram 26, which extends downwardly from its associated cylinder, as shown to particular advantage in FIGURE 1. Each ram 26 is provided with one or more longitudinal ribs 27, and as will be understood, the lower end wall of the cylinder, within which the ram is slidably, longitudinally reciprocable, will have an aperture of corresponding cross section, thus to hold the cylinder and ram against relative rotation about the major, common axis of the cylinder and ram.

Fixedly secured to the lower end of the ram 26 is a yoke 28 of inverted U-shape, and in the lower portions of the legs of the yoke (see FIGURE 8) there are formed transversely aligned openings, in which are journaled the opposite ends of a horizontal, transverse axle 29 carrying a roller 30. The roller 30 is keyed or otherwise secured to the axle 29 for rotation conjointly therewith.

Disposed in parallel relation to the axle 29 above the same is a jack shaft 32, journaled in upper bearing openings 33 formed in the upper portions of the legs of the yoke. Keyed or otherwise secured to the jack shaft 32 for rotation therewith is an upper gear 34, coplanar with and meshing with a lower gear 36, which is similarly secured to the axle 29. Accordingly, on rotation of the shaft 32 there will be produced a rotatable movement of the roller 30, as will be readily understood.

A contractile or expansion spring 38 is connected between yoke 28 and cylinder 22, so that on each extension of the ram 26 (which extension occurs when fluid pressure is directed into the cylinder), the spring will be placed under increased tension. As a result, when pressure within the cylinder is relieved, the spring 38 will be free to contract, so as to instantly retract or pull back the ram, thus to elevate the roller 30 out of contact with the ground surface to permit lowering of the front portion of the vehicle.

Considering now the formation and operational characteristics of the rear jack units 40, which constitute drive units for reasons to be made apparent hereinafter, it will be seen that these units also include generally vertical hydraulic cylinders 42. Cylinders 42, however, rather than being secured to the frame 14, are secured to the end portions of the axle housing 18. Therefore, the rear units are, in actuality, bodily movable in a generally vertical direction in respect to the frame, since the rear wheel suspension is movable in this way in respect to the vehicle frame.

The fixed connection of the cylinders 42 to the ends of the axle housing 18 is effected through the provision of generally triangular mounting brackets or plates 44, which are rigid with the cylinders 42. Referring to FIGURE 2, each plate 44 is rigid with a downwardly opening, semi-cylindrical upper clamping section 46, complementary to a lower, semi-cylindrical, upwardly opening clamp section 48. Sections 46, 48 are in embracing relation to the rear axle housing, and are securely bolted thereabout by means of connecting bolts 49 which join the sections about the axle housing to comprise a clamping sleeve for the purpose of fixedly securing the cylinders 42 to the axle housing. Circumferential slippage about the axle housing is prevented by a stud 49a welded onto said housing and projecting through an opening formed in clamping section 46.

Working in the cylinder 42 is a ram 50, extending downwardly from the cylinder and provided with diametrically opposed longitudinal ribs 52. The lower end wall of the cylinder 42, as will be understood, has openings complementary to the cross sectional shape of the rams, so as to hold the rams and cylinders against relative rotation.

Fixedly secured to the lower end of each ram 50 is a downwardly opening yoke 54, which can appropriately be considered as a double yoke in view of the fact that it has two side-by-side, downwardly opening recesses. Yoke 54 includes a main yoke block 55, and a retaining block 55a connected to the main block by screws 57.

Journaled in yoke 54, in position extending across both recesses, is an axle 58, and keyed to the axle 58 or otherwise connected thereto for rotation conjointly with the axle is a main rear roller 60. Roller 60 is disposed in contact with the ground G on extension of the ram 50 to the position thereof shown in FIGURES 2 and 3. In these circumstances, a contractile pull-back spring 56 connected between cylinder 42 and yoke 54, is placed under increased tension. When fluid pressure within the cylinder 42 is relieved, spring 56 is free to contract, and retracts the ram within the cylinder 42 to the position shown in FIGURE 4.

At one end, axle 58 projects beyond the adjacent side of the yoke 54, and secured to this end of the axle for rotation therewith is an auxiliary, ground-engaging roller 62.

In the other recess 63 of yoke 54 there is rotatably mounted a gear 64, which is also mounted upon the axle 58 for rotation conjointly therewith. Referring to FIGURES 6 and 7, it will be seen that at opposite sides of the gear 64, the shaft 58 is journaled in roller bearings. As will be noted from FIGURE 7, said roller bearings each includes an inner race 65 extending about shaft 58, rollers 66 extending about the inner race in an annular series, and an outer race 67 constituted by the yoke material.

In mesh with the gear 64 (see FIGURE 6) is a worm 68, rotating about a generally vertical axis normal to the axis defined by the axle 58. Gear 64 and worm 68 are of a type permitting either to drive the other. The worm 68 is integral with an upwardly projecting sleeve 70, journaled in a bore 71 defined by confronting recesses 71a, 71b of main yoke block 55 and retaining block 55a respectively. The bore of the sleeve 70 continues through the worm, as shown to especial advantage in FIGURE 6.

Collars 72, 74 are integrally formed with sleeve 70 at locations spaced longitudinally thereon, and are disposed in contact with the top and bottom surfaces of the yoke 54. Ball bearings 75 (each of which may be of the type comprising two half-rings) are interposed between the yoke and the collars, so as to assure freedom of rotation of the gear 68 on the yoke. The opposite faces of yoke 54 are formed with recesses extending into communication with the bore 71 to permit insertion of the bearings between the yoke and collars.

Splined in the sleeve 70 is an upwardly projecting, generally vertical stub shaft 76, having diametrically opposed ribs 78 extending longitudinally thereof, with the sleeve 70 having its bore formed to a complementary cross section, thus to insure that the sleeve 70 and the shaft 76 will rotate conjointly, in each position to which the shaft may be displaced axially of the sleeve. A set screw 79 threaded in sleeve 70 above collar 72 engages in a longitudinal slot 79a of shaft 76, to normally hold the sleeve 70 and shaft 76 against separation, while still permitting relative axial displacement thereof. If it is desired to effect the separation intentionally, however (as for example, if wheel 16 is jammed and the gear means of the parking device is to be disengaged therefrom) the screw 79 can be backed out of slot 79a.

Fixedly mounted upon the upper end of the shaft 76 is a gear 80, having a bore 81, the upper end of which communicates with a cruciform recess 82 provided in the top surface of hte gear. At its lower end, the bore 81 has a shallow counterbore 83, shaped to receive the collar 72 when the parts are in the dotted line position shown in FIGURE 6.

Shaft 76 extends upwardly through the bore 81, and as will be noted from FIGURE 6, the bore 81 is of a diameter substantially greater than that of the shaft 76. This is for the purpose of receiving the portion of the sleeve 70 above collar 72 when the parts are in the dotted line position of FIGURE 6.

On the upper end of the shaft 76, there is rigidly formed a cruciform head 84, shaped to complement the cruciform recess 82. The head 84 is fixedly engaged in recess 82, and it will be understood that any of various well-known expedients might be employed to make the rigid connection between head 84 and gear 80, as by shrinkfitting, force fit, etc. It is mainly important that shaft 76 and gear 80 be connected for conjoint rotatable and longitudinal movement.

Designated at 86 is a large diameter ring gear, which is fixedly secured in any suitable manner to the inner surface of the wheel rim 17 (see FIGURE 2). As will be noted from FIGURE 6, and also from FIGURE 2, the ring gear 86 is provided with a peripheral flange 87, which projects toward the gear 80, and which constitutes an abutment limiting the downward movement of the gear 80 to a position not beyond the full line position shown in FIGURE 6.

The ring gear 86 is formed with an annular series of substantially hemispherically rounded lugs or gear teeth 88, adapted to mesh with radially outwardly projecting gear teeth 89 of gear 80.

The manner of operation of the device will be gone into in full detail hereinafter, but at this point, it may be noted that when the gears 80, 86 are in mesh, rotation of the drive wheels 16 of the vehicle will produce rotational movement of the rollers 60, 62, through the medium of the series of gears 80, 68, and 64 of each jack unit 40.

The series of gears of each jack unit 40 includes, in addition to those named immediately above, gears 90, 92. Gears 90 are connected to axles 58 for rotation conjointly therewith (see FIGURE 4), and are coplanar with and in mesh with gears 92, which are secured to stub shafts 94 journaled in the upper portions of the yokes 54 in parallel relation to the axles 58.

Through a means that will now be described, driving of the rollers of the respective units 40 produces conjoint operation or driving of the rollers 30 of the front units 20.

This is effected through the medium of driving linkages generally designated at 95. The linkages 95 extend along the respective sides of the vehicle, with each linkage 95 extending as a driving connection between the front and rear units 40 respectively, mounted at the same side of the vehicle.

Each linkage 95 includes an elongated connecting rod, and a pair of universal joints. The connecting rod has been designated at 98, and at its ends, is drivingly joined through the medium of universal joints 96, 100, respectively (FIGURE 1) to the shafts 94, 32 of the units 40, 20, respectively. Rotation of shaft 32 of each front unit of course, produces rotation of the roller 30 thereof, through the medium of the series of gears 34, 36 of the front units.

In accordance with the invention, there is provided a hydraulic system generally designated at 101, utilized for the purpose of forcing any suitable hydraulic fluid under pressure into the cylinders of the several units. In the illustrated example, said hydraulic fluid is directed into the several units in such a way as to cause simultaneous extension of all the rams of the various units. Therefore, in the illustrated example the entire vehicle is elevated, that is, all four wheels of the vehicle are simultaneously subjected to an elevating action so as to move out of contact with the ground surface when the rams of the various units have been fully extended.

It is sufficient to note that the arrangement shown can be used, while still retaining the multiplicity of functions inherent in the arrangement shown and described. In other words, one can change a selected tire, by elevating the entire vehicle, or alternatively, one can provide for wheel blocking, to prevent undue slippage of the vehicle in a lateral direction on a slippery surface, again by supplying hydraulic fluid under pressure to all the cylinders simultaneously. Of course, pressure would be supplied to all the cylinders simltaneously for the purpose of parking the vehicle by lateral movement thereof into a parking space.

In the illustrated example, the hydraulic system 101 includes a reservoir 102 which may be fixedly mounted upon a cross member of the vehicle frame. Extending from the reservoir is an outlet or supply line 104, which extends to the intake side of a pump 106 mounted upon the vehicle frame. The output of the pump is delivered to a line 108 extending to a conventional three-way valve 110, and connected to the valve 110 is a main fluid pressure line 112 extending to a line 116, which extends in opposite directions from the line 112 to branch lines 118, 120. The ends of the branch lines 118 are connected in communication with cylinders 22, while the line 120 is similarly connected to the cylinders 42.

The valve 110, when in the FIGURE 1 position, connects lines 108, 112, while closing off a return line 114 that extends from the valve to the reservoir 102. Accordingly, on operation of the pump 106, fluid will be pumped from the reservoir through lines 104, 108, and through the valve 110, to the line 112. As a result, the fluid will be forced under pressure into the several cylinders 22, 42, to simultaneously extend the various rams.

When it is desired to relieve the pressure within the various cylinders for the purpose of permitting retraction of the rams by the pull-back springs associated therewith, the valve 110 is remotely operated through an angular distance of 90 degrees, clockwise from its FIGURE 1 position, thus closing off line 108 and connecting in communication the lines 112, 114. Under the weight of the vehicle and the force of the springs, the rams are retracted and the fluid returns to the reservoir.

In use of the device, normally the several units are in retracted positions such as shown, for example, for the unit 40 in FIGURE 4. Assuming that it is desired to park the vehicle in a space which might be only slightly greater in length than the length of the vehicle, one pulls abreast of said space. Then, with the vehicle transmission in neutral, and the vehicle brakes applied, the vehicle drive wheels will, of course, be stationary, and will be releasably locked against rotational movement.

The vehicle operator then places the pump in operation, causing extension of the various rams, and when the rams are in their fully extended positions, the various wheels of the vehicle will be out of contact with the ground surface.

At this point, reference should be had to FIGURE 6. In the retracted positions, the parts are in the dotted line positions shown in FIGURE 6. However, as the ram 50 begins to extend, the collar 72 will drop out of the counterbore 83, with this occurring only after the ram 50 has been extended a distance sufficient to bring gear 80 into engagement with abutment 87. In other words, during extension of the ram 50, the gear 80, and the gear 68 will initially move downwardly as a unit, since the gear 68 is on sleeve 70, which has its collar 72 in supporting relation to the gear 80, within the counterbore 83.

It may be noted that at this time, the gear 80 is to be out of mesh with the ring gear 86.

However, on continued extension of ram 50, as previously noted, the abutment 87 will engage gear 80 limiting the same against further downward movement. The sleeve 70 will now drop out of the gear 80, with the gear 80 in mesh with the ring gear 86.

The gear 80 meshes with the ring gear 86 immediately prior to movement of the wheel 16 out of contact with the ground surface, and this is desirable, since there will be no tendency of any of the rollers 30, 60, 62, to turn, due to the fact that the drive wheels of the vehicle are releasably locked against rotation, hence, locking all the rollers against rotatable movement. One does not desire the vehicle to move laterally into the parking space until the vehicle has been fully elevated, and the arrangement shown and described insures that said movement will not occur at this time.

Further extension of the ram 50 will now cause elevation of the wheel 16 out of contact with the ground surface and ultimately, the parts will be in their operating positions shown in full lines in FIGURE 6, and also shown in FIGURES 2 and 3.

One may now release the vehicle brake, and place the drive means 15 of the vehicle in "forward" drive, as for example, in low gear. This drives the various ground-engaging rollers in the manner previously discussed herein, causing lateral movement of the vehicle into the parking space. When the vehicle has been fully parked, the vehicle brake is set and the drive means is thrown in neutral, it being understood, of course, that the vehicle brake will not be applied until the vehicle is in neutral, in the sense that the driving torque of the engine is disconnected from the drive wheels.

To move the vehicle out of the parking space, one merely releases the vehicle brake, and places the drive means in "reverse." This causes reverse rotation of the rollers, so as to move the vehicle sideways, out of the parking space.

Then, when the vehicle is back in the roadway, the several rams are retracted, and the vehicle is now ready for normal operation.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

What is claimed is:

1. The combination, with a vehicle frame, a drive wheel axle housing suspended therefrom, and drive wheels mounted at the ends of the axle housing, said drive wheels being releasably lockable against rotatable movement, of a combination parking, jacking, and wheel-blocking device comprising: a pair of first and a pair of second jack units, each of the several units including a generally vertical hydraulic cylinder, a ram working in and extendable downwardly in a straight line from the cylinder from a normally retracted position to elevate the vehicle, a yoke on the ram, a contractile return spring connected between the cylinder and yoke to retract the ram, a ground-engaging roller carried by the ram, and a series of gears drivingly connected with the roller, the cylinders of the first and second units having connections to the chassis; ring gears on the drive wheels movable into and out of mesh with one of the series of gears of the second units responsive to extension and retraction, respectively, of the rams of the second units, said ring gears meshing with said one gear of the second units prior to elevation of the vehicle out of contact with the ground when the rams of the second units are being extended, said ring gears disengaging from said one gear after return of the vehicle into contact with the ground, during retraction of the rams of the second units; and linkages extending along the respective sides of the frame, the linkage of each side providing a driving connection between the series of gears of the first and second units mounted on the same side of the vehicle, each linkage comprising an elongated rod with universal connections at opposite ends drivingly connecting it with the respective units between which it extends, the series of gears of each second unit including a first gear rotating on an axis normal to the length of the ram and coupled to the roller in direct driving relation thereto, a second gear in mesh with the first gear and journalled in the yoke for rotation about an axis paralleling the ram, and a third gear splined to the second gear in direct driving relation thereto and constituting the gear of the series in mesh with the ring gear.

2. A combination parking, jacking, and wheel-blocking device as in claim 1, wherein, in the fully retracted position of the rams, the second gear is in supporting relation to the third gear and is elevated to a height effective to lift the third gear out of mesh with the ring gear.

3. A combination parking, jacking, and wheel-blocking device as in claim 2, wherein the ring gear includes an abutment disposed to engage the third gear during extension of the ram but prior to movement of the ram to its full extended position, said abutment limiting the third gear against movement beyond a position in which it is in mesh with the ring gear.

4. A combination parking, jacking, and wheel-blocking device as in claim 3, wherein said abutment engages the third gear while the vehicle is still in contact with the ground surface to lockingly, drivingly engage the second units and drive wheels.

5. A combination parking, jacking, and wheel-blocking device as in claim 4, wherein the cylinder and ram of each unit are interengaged against relative rotation, with the roller of each unit rotating about an axis paralleling the length of the vehicle.

6. In an attachment to a vehicle chassis including a frame having a pair of oppositely disposed front wheels and a pair of oppositely disposed rear drive wheels, a combination parking, jacking, and wheel-blocking device, comprising rollable ground-engageable front and rear units adjacent said front wheels and said rear drive wheels connected to said chassis and for downward extension in a straight line in a generally vertical direction from normally retracted position to elevate the vehicle, and disconnectable gear means for connecting at least one of said rear units to one of said drive wheels adjacent thereto for moving the vehicle, when elevated, on said rollable units, said means including a first gear connected to the said one of said adjacent drive wheels for rotation therewith, and a second gear having a driving connection with said adjacent one of said rear units, said driving connection including a sliding arrangement of said second gear bodily, in the straight-line, vertical direction, to bring said second gear into driving engagement with said first gear, and means on said one driving wheel to engage said second gear to hold the same against further straight-line, vertical directional movement while said one of said units continues towards its ground-engaging position.

References Cited in the file of this patent

UNITED STATES PATENTS

| 1,840,258 | Schafer | Jan. 5, 1932 |
| 1,928,305 | Blakesley | Sept. 26, 1933 |
| 2,091,326 | Mardovin | Aug. 31, 1937 |
| 2,882,985 | Clark | Apr. 21, 1959 |

FOREIGN PATENTS

| 788,509 | Great Britain | Jan. 2, 1958 |